No. 741,694. PATENTED OCT. 20, 1903.
A. MUTSCHLER.
ADJUSTABLE FOCUSING STOP FOR CAMERAS.
APPLICATION FILED APR. 3, 1903.
NO MODEL.

Witnesses.
Robert Everett.
James L. Norris.

Inventor.
Albert Mutschler.
By James L. Norris.
Att'y.

No. 741,694. Patented October 20, 1903.

UNITED STATES PATENT OFFICE.

ALBERT MUTSCHLER, OF ROCHESTER, NEW YORK, ASSIGNOR, BY MESNE ASSIGNMENTS, TO ROCHESTER OPTICAL COMPANY, OF ROCHESTER, NEW YORK, A CORPORATION OF NEW YORK.

ADJUSTABLE FOCUSING-STOP FOR CAMERAS.

SPECIFICATION forming part of Letters Patent No. 741,694, dated October 20, 1903.

Application filed April 3, 1903. Serial No. 150,956. (No model.)

*To all whom it may concern:*

Be it known that I, ALBERT MUTSCHLER, a citizen of the United States, residing at Rochester, in the county of Monroe and State of New York, have invented new and useful Improvements in Adjustable Focusing-Stops for Cameras, of which the following is a specification.

This invention relates to photographic cameras, and especially to bellows or extensible cameras, and has for its object to provide such a camera with an adjustable stop of improved construction arranged to be quickly clamped in position on the runway on which the lens-carriage travels to limit the outward movement of such carriage when the lens is being adjusted to obtain the proper focus.

To this end my invention consists in the construction, combination, and arrangement of parts hereinafter described, and particularly pointed out in the claims following the description, reference being had to the accompanying drawings, forming a part of this specification, wherein—

Figure 1:
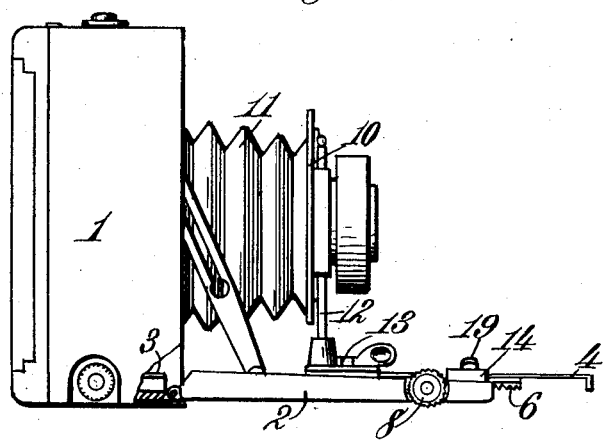
Figure 2:
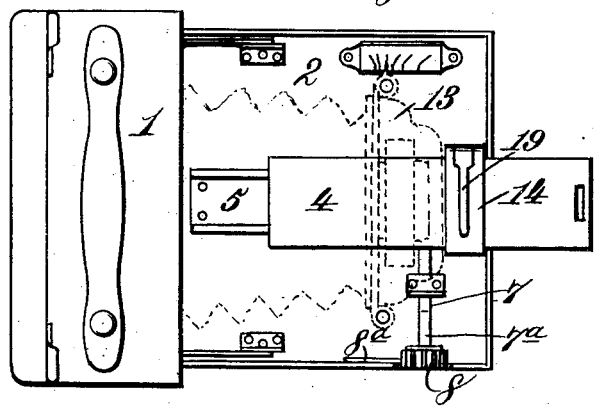
Figure 3:
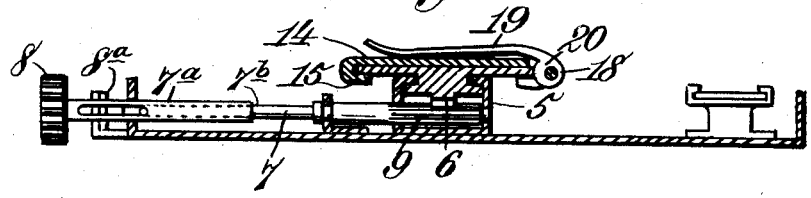
Figure 4:
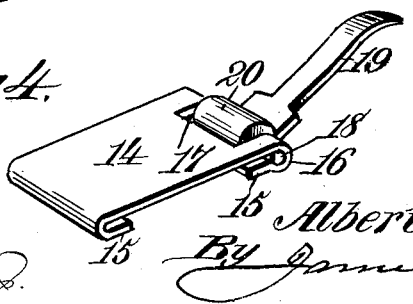

Figure 1 is a side elevation of a camera provided with my improvement. Fig. 2 is a top plan view illustrating the same in connection with the lens-carriage, which is shown in dotted lines. Fig. 3 is a transverse sectional view illustrating my invention and cooperative parts in the particular character of camera construction in connection with which I have shown and illustrated the same. Fig. 4 is a perspective view of the improved adjustable focusing-stop.

Referring to the drawings, the numeral 1 indicates a camera box or casing, and 2 the bed thereof, said bed being hinged at its rear edge to the forward lower edge of the box or casing and is adapted to be turned down to a horizontal position and locked in such position when the camera is in use and is also adapted to be folded up when the camera is not in use and form a closure for the box or casing. When folded to a horizontal position, the bed may, if so desired, be attached to a tripod. Fixed to the bottom of the box or casing is a short runway 3, and movably arranged on the bed is a longitudinally-movable runway 4, which is movably secured to the bed by an auxiliary runway 5 and is provided on its under side with a rack 6. Journaled in bearings on the bed is a shaft 7, provided at its outer end with a knob 8 and at its inner end with a pinion 9, which is adapted to engage the rack 6, whereby by turning said shaft the movable runway 4 may be projected and retracted.

The numeral 10 indicates the lens-plate, which is attached to the bellows 11 and carries the lens, as usual. Said lens-plate is carried by two standards 12, which are fixed at their lower ends to the carriage 13, which is movable back and forth on the runway 4 and is provided with suitable locking mechanism for locking it in any adjusted position to which it may be moved on said runway.

All of the foregoing parts may be constructed in any usual or suitable manner and form no part of the present invention.

Adjustably arranged on the runway 4 is an adjustable stop consisting of a metallic plate 14, the ends of which are turned downwardly and inwardly, as at 15, to embrace the opposite edges of the runway 4. One of the downwardly and inwardly turned ends 15 of the plate 14 is bent into approximately cylindrical shape, as at 16, and is slotted intermediate its ends, as at 17. Mounted in the substantially cylindrical ears 16 thus formed is a pivot-pin 18, which also passes through a cam-lever, which I will now describe.

The numeral 19 indicates a metallic lever, one end of which is bent into substantially cylindrical shape to embrace the pivot-pin 18, and the extreme bent end portion of said lever is thicker than the remaining portion thereof, as at 20, to form a cam, or the cam 20 may be formed by so bending the end of the lever that said end portion will be slightly farther from the center of the approximately cylindrical bent end of the lever than the other portion thereof. The looped or cylindrically-bent end of the lever, as before stated, embraces the pivot-pin 18 and is disposed in the slotted portion 17 of the clamp or stop between the cylindrical ears 16. It will be evident that when the free end of the lever is turned over and away from the stop 14 its bent or looped end will be out of contact with the adjacent edge of the runway 4, and the stop 14 may then be freely moved back and forth on said runway, but that when the said lever is turned over and down upon the stop the cam 20 will be forced into engagement with the adjacent edge of the runway and will bind against the same, thereby firmly securing said stop on the runway against movement.

In practice the stop is employed as follows: What is known in the art as the "equivalent focus" of the camera is ascertained and the stop is moved along the runway 4 and clamped in such position on said runway that it will serve to stop the lens-carriage at that point which will bring the lens to the equivalent focus. This is of much advantage, as amateur photographers and others frequently forget whether the camera is focused or not, and by providing the adjustable stop, which may be fixed on the runway at the point of equivalent focus, oversight on the part of such amateur photographers or other users of the camera is compensated for, as the operator upon opening the camera will only be required to draw out the lens-carriage until it comes into contact and is arrested by the said stop. There is thus provided a common or equivalent-focus stop to which the carriage may be moved rapidly when the camera is opened for use, leaving further adjustment necessary only for close objects or objects which lie within the equivalent focus of the lens. This accurate focusing for close objects is secured by manipulating the shaft 7, by which a very fine or nice focusing may be obtained through the medium of the rack and pinion.

When my improvement is applied to a camera in which there is an extensible runway—such, for example, as illustrated in the drawings—it is of course desirable that the runway when adjusted to varying degrees of extension shall be locked in such adjusted positions, and to permit of this a convenient means is employed, consisting, as shown in the drawings, of a shaft 7, constructed in two parts, one part, 7ª, being tubular and slidable upon the other part, 7ᵇ, and constructed to interlock with the toothed knob 8. A keeper 8ª is secured to the bed in coöperative relation to the parts referred to, so that when the longitudinally-movable part is moved in the proper direction the keeper and knob will interlock, and thus hold the extensible runway in its adjusted position.

Having thus described my invention, what I claim as new, and desire to secure by Letters Patent, is—

1. In a camera, the combination with the camera-bed, of a runway thereon, a lens-carriage adjustable on said runway, and an adjustable stop on said runway comprising a metallic plate provided with downwardly and inwardly turned flanges engaging the opposite edges of said runway, and a cam-lever journaled in one end of said stop and arranged to turn in one direction to bind against the adjacent edge of the runway, and when turned in the other direction to disengage said runway, substantially as described.

2. In a camera, the combination with a bed, of a runway thereon, a lens-carriage movable on the runway, and an adjustable stop on said runway comprising a plate provided at one end with a downwardly and inwardly turned flange arranged to engage one edge of said runway and provided at its other end with two approximately cylindrical ears, a pivot-pin mounted in said ears, and a cam-lever mounted at one end between said ears and provided with a cam portion arranged, when said lever is turned in one direction, to engage the adjacent edge of the runway and clamp the stop thereon and to disengage said runway when turned in the opposite direction, substantially as described.

3. In a camera, the combination with the camera-bed and a runway thereon, of a lens-carriage adjustably mounted on the runway, and an adjustable stop on the runway comprising a plate provided at one end with a downwardly and inwardly turned flange engaging the adjacent edge of the runway, and at its other end with two substantially cylindrical ears which also engage the adjacent edge of the runway, a pivot-pin mounted in said ears, and a cam-lever having one of its ends bent to form a cam-loop which is disposed between said ears and about said pivot-pin and which, when said lever is turned in one direction, engages the adjacent edge of the runway and locks the stop thereon, and when in the opposite direction, disengages said runway, substantially as and for the purpose described.

4. In a camera, the combination with a lens-carriage runway, of a stop arranged thereon, consisting of a plate slidably carried thereby, and a cam-lever journaled in one end of said stop and so arranged that when turned in one direction the cam will bind against the edge of the runway and hold the stop in adjusted position and when turned in the other direction disengage from said runway and permit the stop to be freely adjusted.

In testimony whereof I have hereunto set my hand in presence of two subscribing witnesses.

ALBERT MUTSCHLER.

Witnesses:
MINNA STULL,
GEO. W. REILLY.